United States Patent
Taruya et al.

(10) Patent No.: US 10,434,880 B2
(45) Date of Patent: Oct. 8, 2019

(54) EXTERNAL POWER SUPPLY APPARATUS, ELECTRIC POWER SUPPLY APPARATUS, TRANSPORT APPARATUS, AND MONITORING METHOD

(71) Applicant: HONDA MOTOR CO., LTD., Tokyo (JP)

(72) Inventors: Kenji Taruya, Wako (JP); Yasushi Shionoya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 247 days.

(21) Appl. No.: 15/623,387

(22) Filed: Jun. 15, 2017

(65) Prior Publication Data

US 2018/0029498 A1 Feb. 1, 2018

(30) Foreign Application Priority Data

Jul. 29, 2016 (JP) .................... 2016-150580

(51) Int. Cl.
*B60L 1/00* (2006.01)
*B60L 58/30* (2019.01)
*B60L 58/40* (2019.01)

(52) U.S. Cl.
CPC ............ *B60L 1/00* (2013.01); *B60L 58/30* (2019.02); *B60L 58/40* (2019.02); *B60L 2260/52* (2013.01); *Y02T 90/34* (2013.01)

(58) Field of Classification Search
CPC . Y02T 90/34; B60L 1/00; B60L 58/40; B60L 2260/52; B60L 58/30
See application file for complete search history.

(56) References Cited

U.S. PATENT DOCUMENTS

| | | | |
|---|---|---|---|
| 2016/0114690 A1* | 4/2016 | Matsubara | B60L 11/1861 307/10.1 |
| 2016/0137065 A1* | 5/2016 | Matsubara | B60L 11/1862 307/10.1 |
| 2016/0190619 A1* | 6/2016 | Kazuno | H01M 8/04888 429/428 |

FOREIGN PATENT DOCUMENTS

JP 2016-015825 1/2016

* cited by examiner

*Primary Examiner* — Jared Fureman
*Assistant Examiner* — Duc M Pham
(74) *Attorney, Agent, or Firm* — Mori & Ward, LLP

(57) ABSTRACT

An electric power supply apparatus includes an electric energy storage, an external power supply circuit, an internal power supply circuit, and circuitry. While the transport apparatus stops, the circuitry is configured to monitor the electric energy storage, the external power supply circuit, and the internal power supply circuit. While the transport apparatus stops, the circuitry is configured to calculate a remaining time during which the electric energy storage is to supply electric power to an external electrical load based on a total power amount, an external electric power, and an internal electric power.

13 Claims, 3 Drawing Sheets

EXTERNAL POWER SUPPLY APPARATUS, ELECTRIC POWER SUPPLY APPARATUS, TRANSPORT APPARATUS, AND MONITORING METHOD

CROSS-REFERENCE TO RELATED APPLICATIONS

The present application claims priority under 35 U.S.C. § 119 to Japanese Patent Application No. 2016-150580, filed Jul. 29, 2016, entitled "External Power Supply Apparatus, Transport Apparatus, and Monitoring Method." The contents of this application are incorporated herein by reference in their entirety.

BACKGROUND

1. Field

The present disclosure relates to an external power supply apparatus, an electric power supply apparatus, a transport apparatus, and a monitoring method.

Japanese Unexamined Patent Application Publication No. 2016-015825 discloses a battery management apparatus that manages a battery for supplying power to a drive source and an external apparatus of a vehicle, to thereby recognize the usability of the external apparatus when the external apparatus is to be used with the power from the battery. The battery management apparatus calculates the power to be supplied from the battery by summing power required for driving, which is the power from the battery required for driving the drive source of the vehicle, and power to be used, which is the power from the battery required for using the external apparatus electrically connected to the battery, and calculates the power amount that can be used by the external apparatus on the basis of a difference between a state of charge (SOC) of the battery corresponding to the power requirement and the current SOC.

SUMMARY

According to a first aspect of the present invention, an external power supply apparatus includes an energy storage device, an external power supply circuit, an internal power supply circuit, and a monitoring unit. The energy storage device is installed in a transport apparatus. The external power supply circuit supplies power from the energy storage device to an external electrical load of the transport apparatus. The internal power supply circuit supplies the power from the energy storage device to an internal load installed in the transport apparatus. The monitoring unit monitors a status of the energy storage device, and a status of each of the external power supply circuit and the internal power supply circuit. The monitoring unit calculates, when the transport apparatus is at a stop, a remaining time during which the external electrical load can be driven by the power from the energy storage device, on a basis of a first parameter related to a total power amount that the energy storage device is able to discharge and a second parameter including power supplied from each of the external power supply circuit and the internal power supply circuit.

According to a second aspect of the present invention, an external power supply apparatus includes an energy storage device and a monitoring unit. The energy storage device is installed in a transport apparatus. The monitoring unit monitors a status of the energy storage device, and a working status of each of an external electrical load of the transport apparatus and an internal load installed in the transport apparatus. The monitoring unit calculates, when the transport apparatus is at a stop, a remaining time during which the external electrical load can be driven by the power from the energy storage device, on a basis of a first parameter related to a total power amount that the energy storage device is able to discharge and a second parameter including power consumed by each of the external electrical load and the internal load.

According to a third aspect of the present invention, a monitoring method to be performed by an external power supply apparatus including an energy storage device installed in a transport apparatus, an external power supply circuit that supplies power from the energy storage device to an external electrical load of the transport apparatus, an internal power supply circuit that supplies the power from the energy storage device to an internal load installed in the transport apparatus; and a monitoring unit that monitors a status of the energy storage device, and a status of each of the external power supply circuit and the internal power supply circuit, includes calculating, when the transport apparatus is at a stop, a remaining time during which the external electrical load can be driven by the power from the energy storage device, on a basis of a first parameter related to a total power amount that the energy storage device is able to discharge and a second parameter including power supplied from each of the external power supply circuit and the internal power supply circuit.

According to a fourth aspect of the present invention, an electric power supply apparatus includes an electric energy storage, an external power supply circuit, an internal power supply circuit, and circuitry. The electric energy storage is provided in a transport apparatus. The electric energy storage is to supply electric power to an external electrical load provided outside the transport apparatus via the external power supply circuit. The electric energy storage is to supply electric power to an internal load provided in the transport apparatus via the internal power supply circuit. While the transport apparatus stops, the circuitry is configured to monitor the electric energy storage to acquire a total amount of electric power which is to be discharged from the electric energy storage. While the transport apparatus stops, the circuitry is configured to monitor the external power supply circuit to acquire an external electric power which is supplied from the electric energy storage to the external electrical load via the external power supply circuit. While the transport apparatus stops, the circuitry is configured to monitor the internal power supply circuit to acquire an internal electric power which is supplied from the electric energy storage to the internal electrical load via the internal power supply circuit. While the transport apparatus stops, the circuitry is configured to calculate a remaining time during which the electric energy storage is to supply electric power to the external electrical load based on the total power amount, the external electric power, and the internal electric power.

According to a fifth aspect of the present invention, an electric power supply apparatus includes an electric energy storage and circuitry. The electric energy storage is provided in a transport apparatus. While the transport apparatus stops, the circuitry is configured to monitor the electric energy storage to acquire a total amount of electric power which is to be discharged from the electric energy storage. While the transport apparatus stops, the circuitry is configured to monitor an external electrical load provided outside the transport apparatus to acquire an external consumed electric power which is consumed in the external electrical load.

While the transport apparatus stops, the circuitry is configured to monitor an internal load provided in the transport apparatus to acquire an internal consumed electric power which is consumed in the internal load. While the transport apparatus stops, the circuitry is configured to calculate a remaining time during which the electric energy storage is to supply electric power to the external electrical load based on the total power amount, the external consumed electric power, and the internal consumed electric power.

According to a sixth aspect of the present invention, a monitoring method for an electric power supply apparatus, while a transport apparatus stops, includes monitoring an electric energy storage provided in the transport apparatus to acquire a total amount of electric power which is to be discharged from the electric energy storage. While a transport apparatus stops, an external power supply circuit is monitored to acquire an external electric power which is supplied from the electric energy storage to an external electrical load provided outside the transport apparatus via the external power supply circuit. While a transport apparatus stops, an internal power supply circuit is monitored to acquire an internal electric power which is supplied from the electric energy storage to an internal electrical load provided in the transport apparatus via the internal power supply circuit. While a transport apparatus stops, a remaining time is calculated based on the total power amount, the external electric power, and the internal electric power. The electric energy storage is to supply electric power to the external electrical load during the remaining time.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 2 is at a stop.

DESCRIPTION OF THE EMBODIMENT

Figure 1:
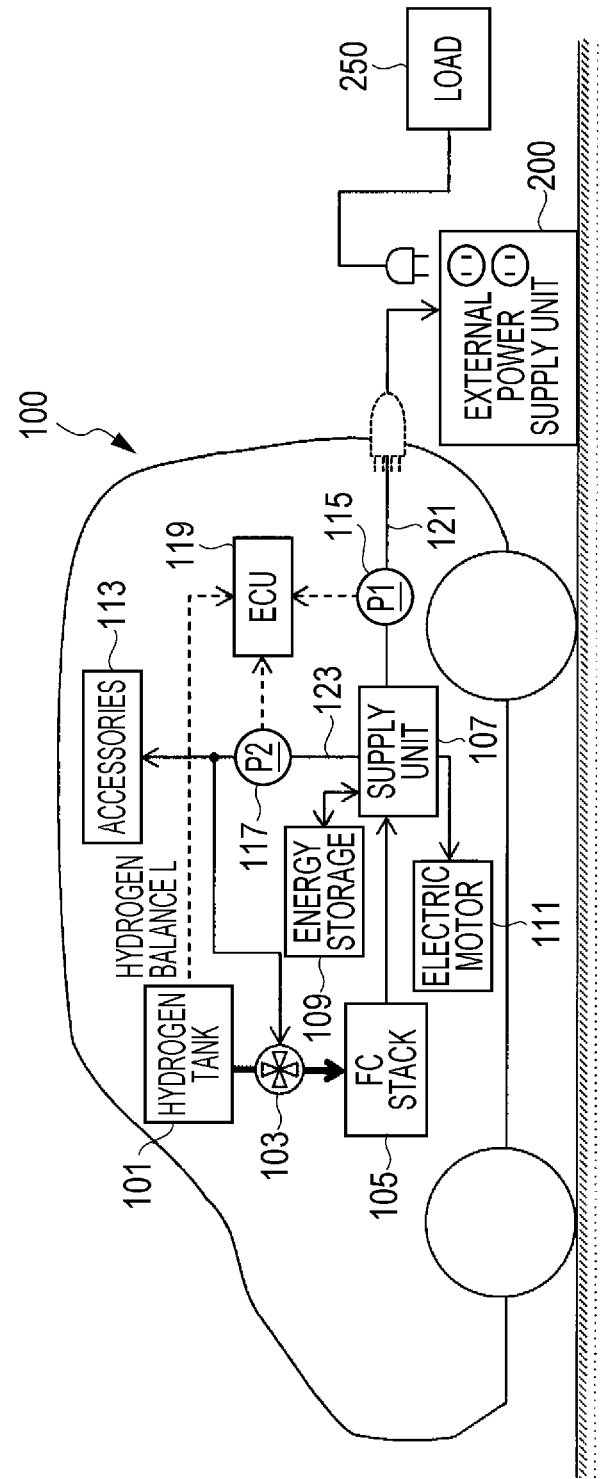
FIG. 1 is a block diagram showing an internal configuration of a fuel cell vehicle.

The embodiments will now be described with reference to the accompanying drawings, wherein like reference numerals designate corresponding or identical elements throughout the various drawings.

Hereafter, an embodiment of the present disclosure will be described with reference to the drawings.

FIG. 1 is a block diagram showing an internal configuration of a fuel cell vehicle. The fuel cell vehicle (hereinafter, simply "vehicle") 100 shown in FIG. 1 includes a hydrogen tank 101, a hydrogen pump 103, a fuel cell (FC) stack 105, a supply unit 107, an energy storage 109, an electric motor 111, accessories 113, power supply measurement units 115 and 117, and an electronic control unit (ECU) 119. In FIG. 1, solid-line arrows indicate flows of power, bold-line arrows indicate flows of fuel, and broken-line arrows indicate flows of control signals or data. An external power supply unit 200 can be connected to the vehicle 100 at a stop, via a non-illustrated cable. The external power supply unit converts power acquired from the vehicle 100 into a form applicable to a vehicle external electrical load 250. The electrical load 250 can be driven upon inserting the plug of the electrical load 250 in the power outlet of the external power supply unit 200 when the external power supply unit 200 is connected to the vehicle 100.

Hereunder, the components of the vehicle 100 will be described.

The hydrogen tank 101 stores hydrogen, which is the fuel for the vehicle 100 to run, or to supply power to the external electrical load 250. The hydrogen tank 101 also measures the balance of the hydrogen stored therein (hydrogen balance L), and transmits the measured value to the ECU 119. The hydrogen pump 103 adjusts the amount of the hydrogen supplied from the hydrogen tank 101 to the FC stack 105. In addition, the hydrogen pump 103 supplies the dry hydrogen stored in the hydrogen tank 101 to the FC stack 105 through a water tank in the hydrogen pump 103, to thereby also adjust the degree of humidification of the hydrogen. The FC stack 105 takes up the hydrogen supplied from the hydrogen pump 103 and oxygen in the air, and generates electrical energy through chemical reaction. Here, the FC stack 105 is an essential element of what is known as fuel cell.

The supply unit 107 supplies the electrical energy generated by the FC stack 105 to the energy storage 109, the electric motor 111, the accessories 113, or the external power supply unit 200 provided outside of the vehicle. The supply unit 107 includes a voltage control unit (VCU) that converts the voltage of the electrical energy acquired from the FC stack 105.

The energy storage 109 includes a plurality of storage cells such as lithium ion batteries and nickel metal hydride batteries, to store the electrical energy generated by the FC stack 105. Here, the energy storage 109 is not limited to secondary batteries such as the lithium ion battery and the nickel metal hydride battery. For example, a capacitor capable of charging and discharging a large amount of energy in a short time, though having a small storage capacity, may be employed as the energy storage 109.

The electric motor 111 generates the force for the vehicle 100 to run. The accessories 113 include electric appliances provided in the vehicle 100, such as an air-conditioner and lights. Both of the electric motor 111 and the accessories 113 are driven by the electrical energy generated by the FC stack 105 or the electrical energy discharged from the energy storage 109. In the description given hereunder, the devices that have to be driven to allow the FC stack 105 to generate the electrical energy, for example the hydrogen pump 103, and the accessories 113 that can be driven by the electrical energy generated by the FC stack 105 will be collectively referred to as "internal load".

The power supply measurement unit 115 measures, out of the electrical energy generated by the FC stack 105, a power amount per unit time P1 (Wh) supplied to the external power supply unit 200 outside of the vehicle through the supply unit 107 and the external power supply path 121. The power supply measurement unit 117 measures, out of the electrical energy generated by the FC stack 105, a power amount per unit time P2 (Wh) supplied to the internal load of the vehicle through the supply unit 107 and the internal power supply path 123. Here, the power supply measurement unit 115 detects the power amount P1 more frequently than the power supply measurement unit 117 detects the power amount P2.

Figure 2:
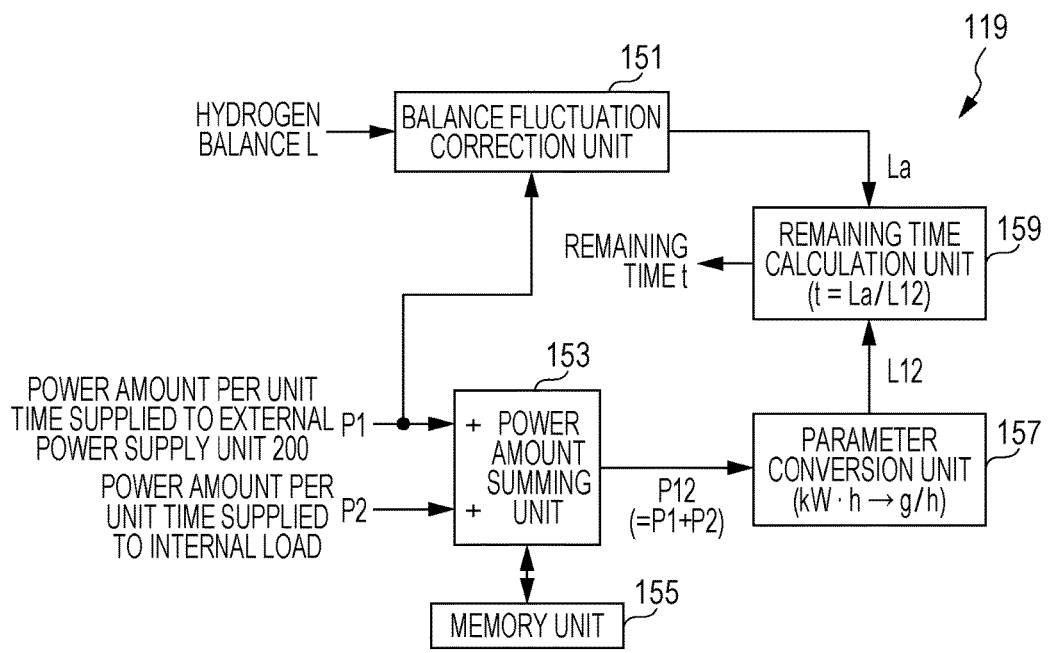
FIG. 2 is a block diagram showing an internal configuration of an ECU.

The ECU 119 monitors the balance of the hydrogen stored in the hydrogen tank 101 (hydrogen balance L) and the power amounts P1 and P2 respectively measured by the power supply measurement units 115 and 117, and calculates, on the basis of the hydrogen balance L and the power amounts P1 and P2, the remaining time during which the electrical load 250 connected to the external power supply unit 200 can be driven by the electrical energy generated by the FC stack 105. FIG. 2 is a block diagram showing an internal configuration of the ECU 119. As shown in FIG. 2, the ECU 119 includes a balance fluctuation correction unit 151, a power amount summing unit 153, a memory unit 155, a parameter conversion unit 157, and a remaining time calculation unit 159.

The balance fluctuation correction unit 151 corrects the hydrogen balance L so as to inhibit the hydrogen balance L measured by the hydrogen tank 101 from shifting to the positive side, when the power amount P1 is larger than 0, in other words when a current is flowing through the external power supply path 121. However, the balance fluctuation correction unit 151 does not perform the mentioned correction when the hydrogen balance L has shifted to the positive side by a significant amount because the hydrogen has been replenished in the hydrogen tank 101.

The power amount summing unit 153 calculates a summed power amount P12 (=P1+P2) by summing the power amount P1 and the power amount P2. Since the power amount P1 is more frequently measured than the power amount P2, the power amount summing unit 153 records the power amount P2 in the memory unit 155. When the power amount P2 is not inputted to the power amount summing unit 153 at the time point that the power amount P1 has been newly inputted, the power amount summing unit 153 reads out the power amount P2 inputted last, to calculate the summed power amount P12.

The parameter conversion unit 157 calculates a hydrogen amount L12 required by the FC stack 105 to generate the electrical energy corresponding to the summed power amount P12 calculated by the power amount summing unit 153. In other words, the hydrogen amount L12 is a value obtained by converting the summed power amount P12 (kW·h) to an amount of hydrogen consumption per unit time.

The remaining time calculation unit 159 divides the hydrogen balance La corrected through the balance fluctuation correction unit 151 by the hydrogen amount L12 calculated by the parameter conversion unit 157 (=La/L12), to thereby obtain a remaining time t during which the electrical load 250 connected to the external power supply unit 200 can be driven. The remaining time t calculated by the remaining time calculation unit 159 is displayed on a non-illustrated display device provided in the vehicle 100, such as a car navigation system.

As described thus far, with the configuration according to this embodiment, the parameter that includes not only the power amount supplied to the external power supply unit 200 but also the power amount supplied to the internal load of the vehicle is utilized, to calculate the remaining time t during which the electrical load 250 connected to the external power supply unit 200 can be driven, when the vehicle 100 is at a stop and the FC stack 105 is supplying, or ready to supply, the electrical energy to the external power supply unit 200 provided outside of the vehicle. Therefore, the remaining time t can be accurately calculated.

In addition, since the hydrogen balance utilized to calculate the remaining time t is inhibited from increasing to the positive side until the hydrogen is replenished in the hydrogen tank 101, the impact of an error on the calculation of the remaining time, caused for example by malfunction, can be minimized by inhibiting the hydrogen balance L from shifting to the positive side.

Further, the power amount per unit time P1 supplied to the external power supply unit 200 outside of the vehicle is measured more frequently than the power amount per unit time P2 supplied to the internal load of the vehicle. This is because the detection of the fluctuation of the power being supplied to the external power supply unit 200 has higher priority than the detection of the fluctuation of the power being supplied to the internal load, from the viewpoint of the calculation of the remaining time t in accordance with the intention of the user of the external power supply. Therefore, detecting the power amount P1 more frequently than detecting the power amount P2 allows the remaining time to fluctuate in accordance with the intention of the user of the external power supply. In other words, detecting the power amount P2 less frequently than detecting the power amount P1 prevents a drastic change of the remaining time t that may take place against the intention of the user of the external power supply.

Thus, according to this embodiment, the remaining time t during which the electrical load 250 connected to the external power supply unit 200 can be driven is accurately calculated, on the basis of the power amount P1 consumed outside of the vehicle, the power amount P2 consumed by the internal load, and the hydrogen balance L in the hydrogen tank 101, when the vehicle 100 is at a stop and the external power supply unit 200 is connected to the vehicle 100. Here, the battery management apparatus according to Japanese Unexamined Patent Application Publication No. 2016-015825 may appear to be intended for a similar goal to that of this embodiment, in accurately calculating the remaining time in order to recognize the usability of the apparatus with high accuracy when driving the apparatus with the power from the battery. However, the configuration and working according to the cited document are different, as is apparent from FIG. 3 and FIG. 4 referred to hereunder.

Figure 3:
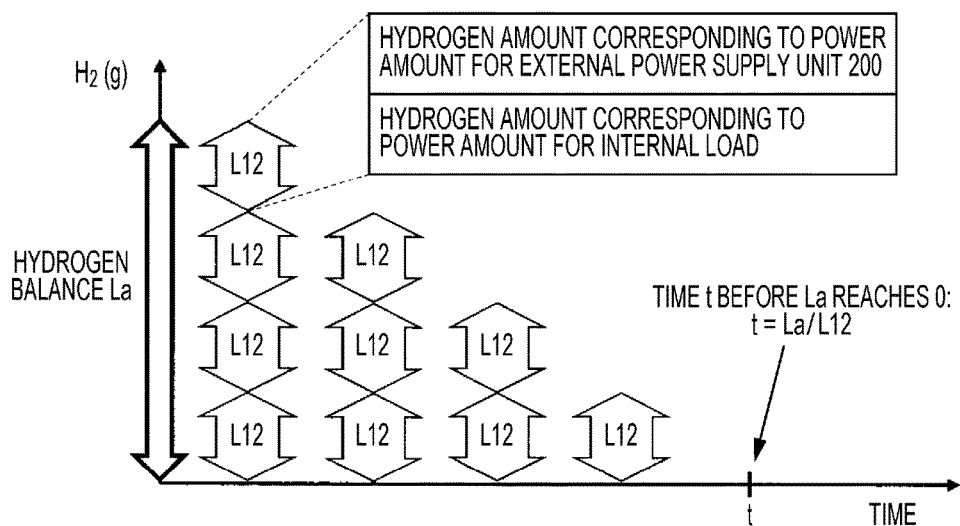
FIG. 3 is a schematic diagram for explaining a method of calculating a remaining time for an electrical load, when external power supply is performed while the fuel cell vehicle shown in FIG. 1
Figure 4:
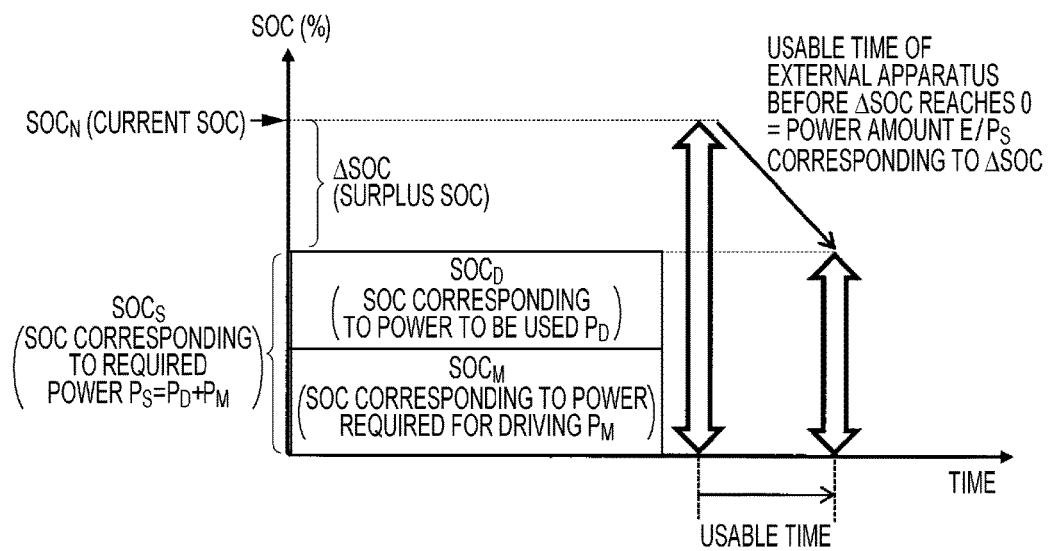
FIG. 4 is a schematic diagram for explaining a method of calculating a usable time of an external apparatus of the vehicle according to Japanese Unexamined Patent Application Publication No. 2016-015825.

FIG. 3 is a schematic diagram for explaining a method of calculating the remaining time t for the electrical load 250, when the external power supply is performed while the vehicle 2100 shown in FIG. 1 and FIG. 2 is at a stop. FIG. 4 is a schematic diagram for explaining a method of calculating the usable time of the external apparatus in the vehicle according to the above-cited document. The numerator in a calculation formula of the remaining time t shown in FIG. 3 is the balance La of the hydrogen stored in the hydrogen tank 101. The numerator in a calculation formula of the usable time shown in FIG. 4 is a power amount corresponding to a surplus SOC which is the difference between the current SOC of the battery and the SOC corresponding to the power requirement Ps. Such a feature of this embodiment, in that the numerators of the calculation formula for calculating the usable time (remaining time t) of the external apparatus with respect to the electrical load 250 are different from each other, constitutes a remarkable difference from the configuration according to the above-cited document.

The present disclosure is not limited to the foregoing embodiment, and various modifications or improvements may be made. For example, although the foregoing embodiment refers to the fuel cell vehicle, the present disclosure is also applicable to a series hybrid electrical vehicle (HEV) in which an internal combustion engine that employs gasoline as fuel drives a power generator to generate the electrical energy. In this case, the gasoline tank for storing the gasoline corresponds to the hydrogen tank 101, and the internal combustion engine and the power generator correspond to the FC stack 105. Alternatively, the vehicle may by an electric vehicle (EV) that does not convert the fuel such as hydrogen or gasoline into energy of another form. In this case, the energy storage device corresponds to the hydrogen tank 101, and the power generator corresponds to the FC stack 105. Further, the fuel for the fuel cell vehicle is not limited to hydrogen, but may be hydrocarbon or alcohol. The fuel cell vehicle may also include an oxygen tank for storing oxygen used for reaction with the fuel.

In a first aspect, the present disclosure provides an external power supply apparatus including an energy storage device (e.g., FC stack 105 in an embodiment subsequently described) installed in a transport apparatus (e.g., vehicle 100 in the embodiment subsequently described), an external power supply circuit (e.g., external power supply path 121 in the embodiment subsequently described) that supplies power from the energy storage device to an external electrical load (e.g., electrical load 250 in the embodiment subsequently described) of the transport apparatus, an internal power supply circuit (e.g., internal power supply path 123 in the embodiment subsequently described) that supplies the power from the energy storage device to an internal load installed in the transport apparatus, and a monitoring unit (e.g., ECU 119 in the embodiment subsequently described) that monitors a status of the energy storage device, and a status of each of the external power supply circuit and the internal power supply circuit, in which the monitoring unit calculates, when the transport apparatus is at a stop, a remaining time during which the external electrical load can be driven by the power from the energy storage device, on a basis of a first parameter related to a total power amount that the energy storage device is able to discharge and a second parameter including power supplied from each of the external power supply circuit and the internal power supply circuit.

With the configuration according to the first aspect, as well as fifth to seventh aspects to be subsequently described, the second parameter, which is based not only on the power supplied from the energy storage device to the external electrical load, but also on the power supplied from the energy storage device to the internal load, is utilized to calculate the remaining time during which the external electrical load can be driven by the power from the energy storage device, when the transport apparatus is at a stop and the energy storage device is supplying, or ready to supply, the power to the external electrical load. Therefore, the remaining time can be accurately calculated.

In a second aspect, the energy storage device of the external power supply apparatus according to the first aspect may be a fuel cell, the first parameter may be a balance of a fuel (e.g., hydrogen in the embodiment subsequently described) that can be supplied to the fuel cell, and the second parameter may be a value converted into an amount of fuel consumption per unit time from the power supplied from each of the external power supply circuit and the internal power supply circuit.

With the arrangement according to the second aspect, an accurate remaining time can be calculated when the power generated by the fuel cell installed in the transport apparatus is supplied to the external electrical load.

In a third aspect, the monitoring unit of the external power supply apparatus according to the second aspect may inhibit the balance of the fuel from shifting to a positive side, when the external power supply circuit is in operation and the fuel is not replenished to the energy storage device.

With the arrangement according to the third aspect, the fuel balance is inhibited from increasing to the positive side until the fuel is replenished. Inhibiting thus the fuel balance from shifting to the positive side minimizes the impact of an error on the calculation of the remaining time, even when the fuel balance, in other words the first parameter, is inaccurately detected, for example by malfunction.

In a fourth aspect, the monitoring unit of the external power supply apparatus according to any one of the first to the third aspects may detect the status of the external power supply circuit more frequently than detecting the status of the internal power supply circuit.

To calculate the remaining time in accordance with the intention of the person using the external power supply, detection of the fluctuation of the status of the external power supply circuit has higher priority than detection of the fluctuation of the status of the internal power supply circuit. Therefore, detecting the status of the external power supply circuit more frequently than detecting the status of the internal power supply circuit, as arranged in the fourth aspect, allows the remaining time to fluctuate in accordance with the intention of the user of the external power supply. In other words, detecting the status of the internal power supply circuit less frequently than detecting the status of the external power supply circuit prevents a drastic change of the remaining time that may take place against the intention of the user of the external power supply.

In a fifth aspect, the present disclosure provides an external power supply apparatus including an energy storage device (e.g., FC stack 105 in an embodiment subsequently described) installed in a transport apparatus (e.g., vehicle 100 in the embodiment subsequently described), and a monitoring unit (e.g., ECU 119 in the embodiment subsequently described) that monitors a status of the energy storage device, and a working status of each of an external electrical load (e.g., electrical load 250 in the embodiment subsequently described) of the transport apparatus and an internal load installed in the transport apparatus, in which the monitoring unit calculates, when the transport apparatus is at a stop, a remaining time during which the external electrical load can be driven by the power from the energy storage device, on a basis of a first parameter related to a total power amount that the energy storage device is able to discharge and a second parameter including power consumed by each of the external electrical load and the internal load.

In a sixth aspect, the present disclosure provides a transport apparatus including the external power supply apparatus according to any one of the first to the fifth aspects.

In a seventh aspect, the present disclosure provides a monitoring method to be performed by an external power supply apparatus including an energy storage device (e.g., FC stack 105 in an embodiment subsequently described) installed in a transport apparatus (e.g., vehicle 100 in the embodiment subsequently described), an external power supply circuit (e.g., external power supply path 121 in the embodiment subsequently described) that supplies power from the energy storage device to an external electrical load (e.g., electrical load 250 in the embodiment subsequently described) of the transport apparatus, an internal power supply circuit (e.g., internal power supply path 123 in the embodiment subsequently described) that supplies the power from the energy storage device to an internal load installed in the transport apparatus, and a monitoring unit (e.g., ECU 119 in the embodiment subsequently described) that monitors a status of the energy storage device, and a status of each of the external power supply circuit and the internal power supply circuit, the monitoring method including calculating, when the transport apparatus is at a stop, a remaining time during which the external electrical load can be driven by the power from the energy storage device, on a basis of a first parameter related to a total power amount that the energy storage device is able to discharge and a second parameter including power supplied from each of the external power supply circuit and the internal power supply circuit.

Obviously, numerous modifications and variations of the present invention are possible in light of the above teachings. It is therefore to be understood that within the scope of the appended claims, the invention may be practiced otherwise than as specifically described herein.

What is claimed is:

1. An external power supply apparatus comprising:
   an energy storage device installed in a transport apparatus, the energy storage device including a fuel cell;
   an external power supply circuit that supplies power from the energy storage device to an external electrical load of the transport apparatus;
   an internal power supply circuit that supplies the power from the energy storage device to an internal load installed in the transport apparatus; and
   a monitoring unit that monitors a status of the energy storage device, and a status of each of the external power supply circuit and the internal power supply circuit,
   wherein the monitoring unit calculates, when the transport apparatus is at a stop, a remaining time during which the external electrical load can be driven by the power from the energy storage device, on a basis of a first parameter related to a total power amount that the energy storage device is able to discharge and a second parameter including power supplied from each of the external power supply circuit and the internal power supply circuit, by dividing the first parameter by the second parameter,
   wherein the first parameter is a balance of a fuel that can be supplied to the fuel cell, and
   wherein the second parameter is a value converted into an amount of fuel consumption per unit time from the power supplied from each of the external power supply circuit and the internal power supply circuit.

2. The external power supply apparatus according to claim 1, wherein the monitoring unit inhibits the balance of the fuel from shifting to a positive side, when the external power supply circuit is in operation and the fuel is not replenished to the energy storage device.

3. The external power supply apparatus according to claim 1, wherein the monitoring unit detects the status of the external power supply circuit more frequently than detecting the status of the internal power supply circuit.

4. A transport apparatus comprising the external power supply apparatus according to claim 1.

5. An external power supply apparatus comprising:
   an energy storage device installed in a transport apparatus, the energy storage device including a fuel cell; and
   a monitoring unit that monitors a status of the energy storage device, and a working status of each of an external electrical load of the transport apparatus and an internal load installed in the transport apparatus,
   wherein the monitoring unit calculates, when the transport apparatus is at a stop, a remaining time during which the external electrical load can be driven by the power from the energy storage device, on a basis of a first parameter related to a total power amount that the energy storage device is able to discharge and a second parameter including power consumed by each of the external electrical load and the internal load, by dividing the first parameter by the second parameter,
   wherein the first parameter is a balance of a fuel that can be supplied to the fuel cell, and
   wherein the second parameter is a value converted into an amount of fuel consumption per unit time from the power supplied from each of the external power supply circuit and the internal power supply circuit.

6. A monitoring method to be performed by an external power supply apparatus including:
   an energy storage device installed in a transport apparatus, the energy storage device including a fuel cell;
   an external power supply circuit that supplies power from the energy storage device to an external electrical load of the transport apparatus;
   an internal power supply circuit that supplies the power from the energy storage device to an internal load installed in the transport apparatus; and
   a monitoring unit that monitors a status of the energy storage device, and a status of each of the external power supply circuit and the internal power supply circuit,
   the method comprising calculating, when the transport apparatus is at a stop, a remaining time during which the external electrical load can be driven by the power from the energy storage device, on a basis of a first parameter related to a total power amount that the energy storage device is able to discharge and a second parameter including power supplied from each of the external power supply circuit and the internal power supply circuit, by dividing the first parameter by the second parameter,
   wherein the first parameter is a balance of a fuel that can be supplied to the fuel cell, and
   wherein the second parameter is a value converted into an amount of fuel consumption per unit time from the power supplied from each of the external power supply circuit and the internal power supply circuit.

7. An electric power supply apparatus comprising:
   an electric energy storage provided in a transport apparatus, the electric energy storage including a fuel cell;
   an external power supply circuit via which the electric energy storage is to supply electric power to an external electrical load provided outside the transport apparatus;
   an internal power supply circuit via which the electric energy storage is to supply electric power to an internal load provided in the transport apparatus; and
   circuitry, while the transport apparatus stops, configured to:
      monitor the electric energy storage to acquire a total amount of electric power which is to be discharged from the electric energy storage;
      monitor the external power supply circuit to acquire an external electric power which is supplied from the electric energy storage to the external electrical load via the external power supply circuit;
      monitor the internal power supply circuit to acquire an internal electric power which is supplied from the electric energy storage to the internal electrical load via the internal power supply circuit; and
      calculate a remaining time during which the electric energy storage is to supply electric power to the external electrical load based on the total power amount, the external electric power, and the internal electric power, wherein a first parameter is a balance of a fuel that can be supplied to the fuel cell, wherein a second parameter is a value converted into an amount of fuel consumption per unit time from power supplied from each of the external power supply circuit and the internal power supply circuit, and wherein the circuitry is configured to calculate the remaining time based on the first parameter and the second parameter by dividing the first parameter by the second parameter.

8. The electric power supply apparatus according to claim 7, wherein the circuitry is configured to inhibit the balance of the fuel from shifting to a positive side, when the external power supply circuit is in operation and the fuel is not replenished to the electric energy storage.

9. The electric power supply apparatus according to claim 7, wherein the circuitry is configured to detect a status of the external power supply circuit more frequently than detecting a status of the internal power supply circuit.

10. A transport apparatus comprising the electric power supply apparatus according to claim 7.

11. An electric power supply apparatus comprising:
an electric energy storage provided in a transport apparatus, the electric energy storage including a fuel cell; and
circuitry, while the transport apparatus stops, configured to:
monitor the electric energy storage to acquire a total amount of electric power which is to be discharged from the electric energy storage;
monitor an external electrical load provided outside the transport apparatus to acquire an external consumed electric power which is consumed in the external electrical load;
monitor an internal load provided in the transport apparatus to acquire an internal consumed electric power which is consumed in the internal load; and
calculate a remaining time during which the electric energy storage is to supply electric power to the external electrical load based on the total power amount, the external consumed electric power, and the internal consumed electric power, wherein a first parameter is a balance of a fuel that can be supplied to the fuel cell, wherein a second parameter is a value converted into an amount of fuel consumption per unit time from the external consumed electric power and the internal consumed electric power, and wherein the circuitry is configured to calculate the remaining time based on the first parameter and the second parameter by dividing the first parameter by the second parameter.

12. The electric power supply apparatus according to claim 11, wherein a first parameter is related to the total amount of electric power, a second parameter includes the external consumed electric power and the internal consumed electric power.

13. A monitoring method for an electric power supply apparatus, while a transport apparatus stops, comprising:
monitoring an electric energy storage provided in the transport apparatus to acquire a total amount of electric power which is to be discharged from the electric energy storage, the electric energy storage including a fuel cell;
monitoring an external power supply circuit to acquire an external electric power which is supplied from the electric energy storage to an external electrical load provided outside the transport apparatus via the external power supply circuit;
monitoring an internal power supply circuit to acquire an internal electric power which is supplied from the electric energy storage to an internal electrical load provided in the transport apparatus via the internal power supply circuit; and
calculating a remaining time during which the electric energy storage is to supply electric power to the external electrical load based on the total power amount, the external electric power, and the internal electric power, wherein a first parameter is a balance of a fuel that can be supplied to the fuel cell, wherein a second parameter is a value converted into an amount of fuel consumption per unit time from power supplied from each of the external power supply circuit and the internal power supply circuit, and wherein the circuitry is configured to calculate the remaining time based on the first parameter and the second parameter by dividing the first parameter by the second parameter.

* * * * *